Oct. 6, 1959 E. A. GOYETTE 2,907,469
SMOKER'S PIPE RACK
Filed June 10, 1954

Inventor
Ernest A. Goyette
By Fred Herbach his Atty.

United States Patent Office 2,907,469
Patented Oct. 6, 1959

2,907,469
SMOKER'S PIPE RACK
Ernest A. Goyette, Chicago, Ill.
Application June 10, 1954, Serial No. 435,801
1 Claim. (Cl. 211—60)

The invention relates to pipe racks.

One object of the invention is to provide a rack which is simple in construction, light in weight, adapted for pipes of different contours and is attractive in appearance.

Other objects will appear from the detailed description.

The invention consists in the several novel features hereinafter set forth and more particularly defined by claim at the conclusion hereof.

Figure 1:
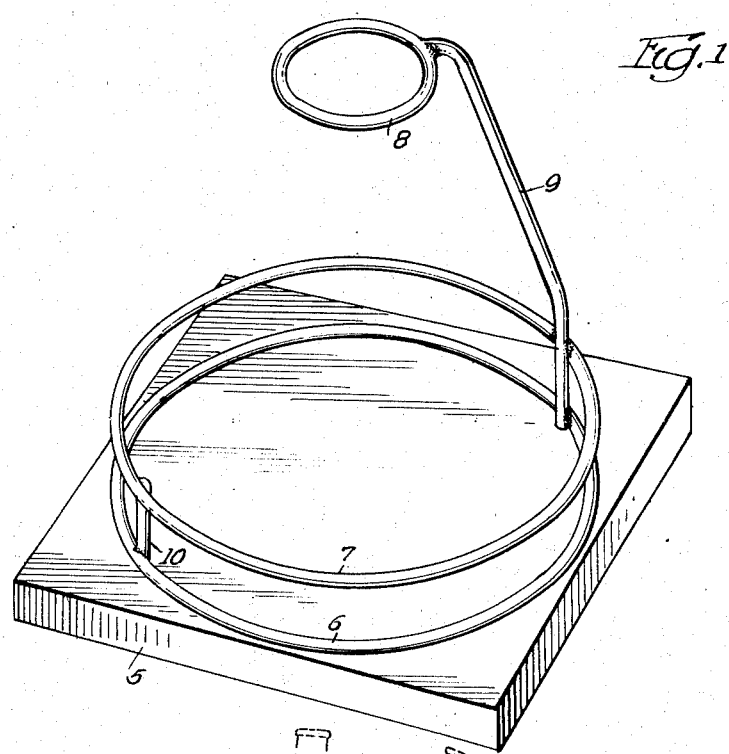
Fig. 1 is a perspective view of a pipe rack embodying the invention.
Figure 2:
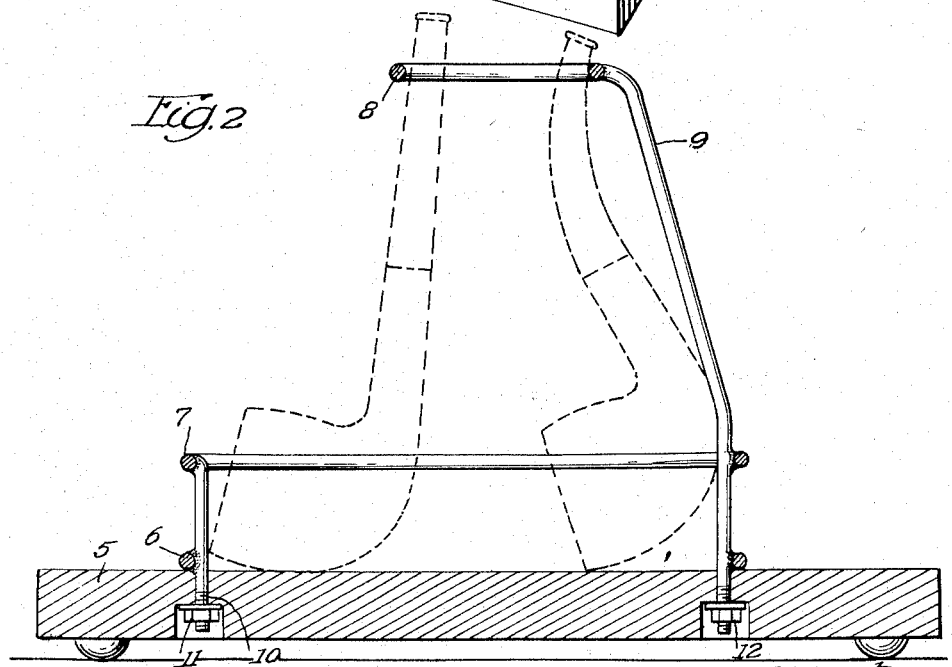
Fig. 2 is a vertical section.

The invention is exemplified in a rack which comprises, a rectangular base 5 which may be made of suitable material and pipe-holding means mounted on the base and built up essentially of round wire. This holding means comprises, a circular ring 6 which engages the top face of base 5 and a ring 7 of wire of substantially the same diameter and spaced vertically from and in vertical alignment with the lower ring 6, an upper ring 8 disposed centrally over the rings 6 and 7 and a standard or post 9 which supports the ring 8. The rings 6 and 7 at one side are supported in vertically spaced relation and over the base by an upstanding rod 10 which extends between and is welded or soldered to rings 6 and 7 and extends through a hole in base 5. A nut 11 in a socket in the underface of said base is threaded to the lower end rod 10 and clamps ring 6 on the base. The lower portion of standard 9, at a point diametrically opposite the rod 10, is welded or soldered to rings 6 and 7 and extends through a hole in the base. A nut 12 is threaded to the lower end of standard 9 and is adapted to clamp ring 6 on the base. The rings 7 and 8 are circular. The circular area on the base inside of rings 6 and 7 constitutes an unobstructed rest for bowls of smokers' pipes of different sizes and shapes. The area within ring 8 is spokeles or unobstructed and is positioned centrally above rings 6 and 7 to freely receive the stems or mouthpieces of the pipes resting on the base inside of ring 6 when they have been inserted angularly and upwardly between the rings 7 and 8 into the ring 8.

In the use of the rack, a pipe is placed therein by inserting its stem angularly from below into any part of ring 8, and then moving the bowl angularly over any part of the area in ring 7 and dropping it onto the base. The bowls of the pipes may be indiscriminately placed on base 5 within ring 8 and moved into close relation for the maximum number of pipes. In removing a pipe, its stem is raised in ring 8 until its bowl clears the ring 7. The bowl is then swung outward above ring 7 and its stem withdrawn downwardly and outwardly from ring 8. The rod 10 extends angularly upward and inward at a single point circumferentially of rings 7 and 8. This leaves substantially the entire area within and above ring 7 and between rings 7 and 8 clear for the manipulation of the pipe into and out of the rack, and the entire area of the base within ring 6 available for the pipe bowls in close relation for maximum capacity of the rack. The entire area within ring 8 is also available for the pipe stems.

The invention is characterized by its simplicity in construction, ease of placement and removal of the pipes; maximum capacity for the area provided, its adaptability for pipes of different shapes, lightness in weight and its streamlined appearance.

The invention is not to be understood as restricted to the details set forth, since these may be modified within the scope of the appended claim without departing from the spirit and scope of the invention.

Having thus described the invention what I claim as new and desire to secure by Letters Patent is:

A smoker's pipe rack including a relatively thick base support providing an upwardly facing horizontal planar top surface, and a wire rack assembly mounted on said base, said rack assembly comprising a lower continuous circular wire ring centered upon said planar top surface in circumferential coextensive contact with the latter, the diameter of said ring being such that it encompasses an area of the top surface sufficiently great that it may loosely support thereon the bowl portions of several pipes promiscuously arranged on the top surface, an upper continuous circular wire ring coaxial with said lower ring, spaced upwardly therefrom a distance no greater than the overall diameter of a pipe bowl, and of the same diameter as that of said lower ring, said upper ring being adapted to confine the bowl portions of said several pipes within the general confines of an imaginary cylinder coaxial with and passing through said rings, a straight vertical spacer rod comprising a relatively short length of wire having its extreme upper end secured by welding to a point on said upper ring, having its medial region secured by welding to a point on said lower ring, and having its lower end region projecting downwardly through said base support, said lower end region of the spacer rod being threaded and exposed below the base support, a combined spacer rod and pipe stem retainer comprising a relatively long length of wire including a straight lower vertical section, an inclined medial section and an upper horizontal ring section, said lower section having its upper end region secured by welding to the upper ring at a point diametrically opposed to said point on the upper ring at which the upper end of the spacer rod is secured, having its medial region secured by welding to a point on said lower ring diametrically opposed to said point on the lower ring at which the medial region of the spacer rod is secured, and having its lower end region projecting downwardly through said base support, said lower end region of said lower section being threaded and exposed below the base support, said upper horizontal ring section being in the form of a continuous circular ring of appreciably less diameter than the diameters of said upper and lower rings, coaxial with said upper and lower rings, and spaced above the top surface of said base support a distance less than the overall stem length of a pipe, said upper horizontal ring section being adapted to confine therein the distal end regions of the stem portions of such pipes as are loosely supported on said top surface, said spacer rod and said combined spacer rod and pipe stem retainer constituting the sole means for maintaining said upper and lower rings in their spaced relationship, and clamping nuts threadedly received on said exposed end regions of the spacer rod and the combined spacer rod and pipe stem retainer respectively and serving to draw said lower ring tightly against said top surface of the base support.

References Cited in the file of this patent

UNITED STATES PATENTS

| | | |
|---|---|---|
| 481,188 | Northam | Aug. 23, 1892 |
| 519,387 | Michael | May 8, 1894 |
| 528,148 | Cauble | Oct. 30, 1894 |
| 616,555 | Paddock | Dec. 27, 1898 |
| 695,380 | Duer | Mar. 11, 1902 |
| 1,173,210 | Ochs | Feb. 29, 1916 |
| 1,622,633 | Faiella | Mar. 29, 1927 |
| 2,174,093 | Perlman | Sept. 26, 1939 |
| 2,195,988 | Hoeruegel | Apr. 2, 1940 |
| 2,235,986 | Ellingson | Mar. 25, 1941 |
| 2,291,933 | Vevirit | Aug. 4, 1942 |
| 2,433,170 | Still | Dec. 23, 1947 |
| 2,463,651 | Stevens | Mar. 8, 1949 |
| 2,570,504 | Van House | Oct. 9, 1951 |
| 2,570,712 | Rhine | Oct. 9, 1951 |
| 2,632,320 | Liss | Mar. 24, 1953 |

FOREIGN PATENTS

| | | |
|---|---|---|
| 65,862 | Denmark | Nov. 10, 1947 |